(12) United States Patent
Hicks et al.

(10) Patent No.: US 9,030,430 B2
(45) Date of Patent: May 12, 2015

(54) MULTI-TOUCH NAVIGATION MODE

(71) Applicant: barnesandnoble.com llc, New York, NY (US)

(72) Inventors: Kourtny M. Hicks, Sunnyvale, CA (US); Andrew Hargreaves, Burlingame, CA (US); Amir Mesguich Havilio, Palo Alto, CA (US); Dale J. Brewer, San Marcos, CA (US)

(73) Assignee: barnesandnoble.com llc, New York, NY (US)

( * ) Notice: Subject to any disclaimer, the term of this patent is extended or adjusted under 35 U.S.C. 154(b) by 126 days.

(21) Appl. No.: 13/715,313

(22) Filed: Dec. 14, 2012

(65) Prior Publication Data
US 2014/0168077 A1    Jun. 19, 2014

(51) Int. Cl.
*G06F 3/0488* (2013.01)
(52) U.S. Cl.
CPC .................. *G06F 3/04883* (2013.01)
(58) Field of Classification Search
CPC ............... G06F 3/03547; G06F 3/041–3/047; G06F 3/048; G06F 3/0483; G06F 3/0484; G06F 3/0487–3/04886; G06F 2203/04104–2203/04808
USPC ................. 345/156, 173–178, 901; 178/18.01–18.09, 18.11; 715/764, 776, 715/863
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |

(Continued)

FOREIGN PATENT DOCUMENTS

| | | |
|---|---|---|
| EP | 0722150 A1 | 7/1996 |
| WO | WO 2011013400 A1 * | 2/2011 |

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Sherman
(74) *Attorney, Agent, or Firm* — Finch & Maloney PLLC

(57) ABSTRACT

Techniques are disclosed for providing a navigation mode in electronic touch sensitive devices. The navigation mode can be used to advance forward and backward through displayed pages of content on a page-by-page or multi-page basis, such as pages of an eBook, photos, lists such as search results and files, or other consumable content that can be displayed in a page-like fashion. The user can engage the navigation mode with a particular gesture that includes a combination of contact points that uniquely and/or globally identify that the navigation mode is desired. The combination may include, for example, a press-and-hold activation contact point by one hand of the user, and one or more additional moving gesture contact points that indicate the desired navigation using the other hand of the user. Horizontal and/or vertical paging speeds correspond to the number of moving contact points, which can be effected with swiping or circular gestures.

20 Claims, 6 Drawing Sheets

(56) References Cited

U.S. PATENT DOCUMENTS

| | | | |
|---|---|---|---|
| 8,004,498 B1* | 8/2011 | Meridian | 345/173 |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0057260 A1* | 5/2002 | Mathews et al. | 345/173 |
| 2002/0116421 A1 | 8/2002 | Fox et al. | |
| 2007/0047002 A1 | 3/2007 | Hull et al. | |
| 2008/0036747 A1 | 2/2008 | Hope | |
| 2009/0066668 A1* | 3/2009 | Kim et al. | 345/173 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0148786 A1* | 6/2011 | Day et al. | 345/173 |
| 2011/0258542 A1 | 10/2011 | Kenney et al. | |
| 2012/0056821 A1 | 3/2012 | Goh | |
| 2012/0127109 A1* | 5/2012 | Nishio et al. | 345/173 |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, Kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do Wacom tablets work?," tablet4u.co.uk, http://www.tablet4u.co.uk/techinfo.html, 2 pages, printed from the Internet on Jun. 20, 2013.

"Explaining how the sPen tech works (and is very diff than other styluses)," http://forum.xda-developers.com/showthread.php?t=, 1 page, printed from the Internet on Jan. 15, 2013.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages. Endures in the Digital World," originally posted on May 11, 2012 at 3:48PM, Gadget Lab, http://www.wired.com/gadgetlab/2012/05/

(56) References Cited

OTHER PUBLICATIONS why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

\* cited by examiner

MULTI-TOUCH NAVIGATION MODE

FIELD OF THE DISCLOSURE

This disclosure relates to electronic display devices, and more particularly, to user interface techniques for interacting with touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
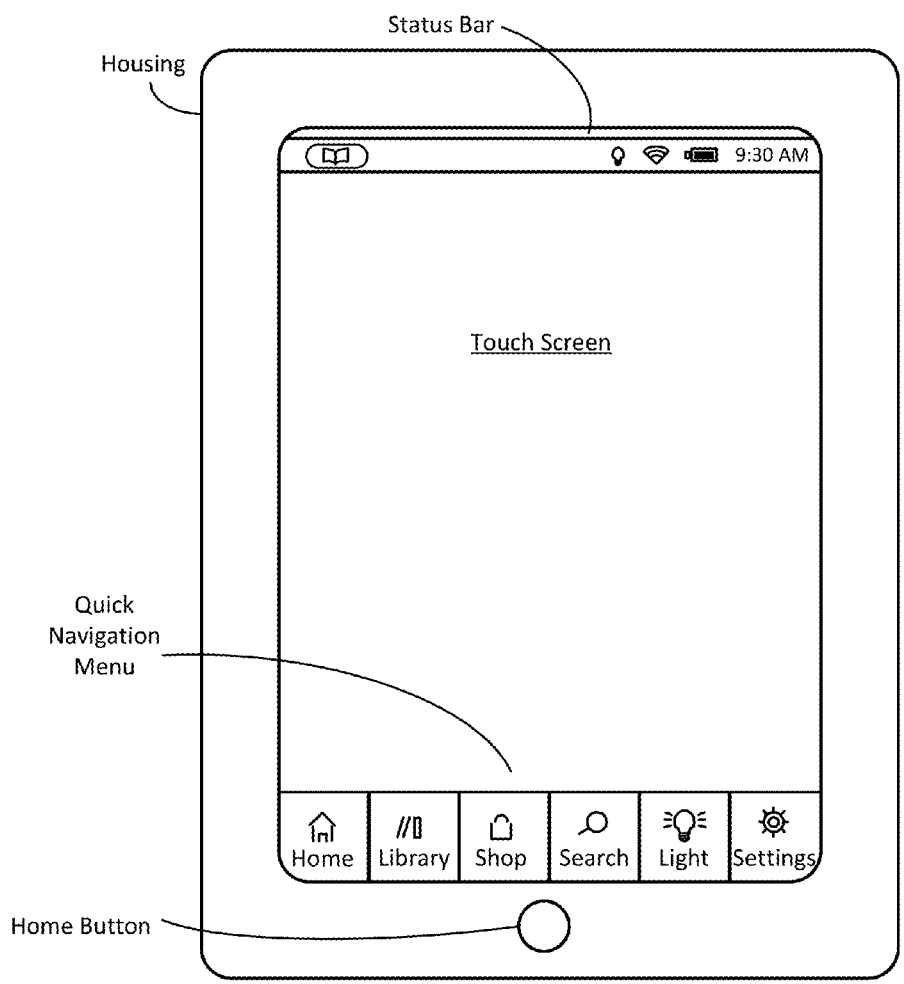
FIGS. 1a-b illustrate an example electronic touch sensitive device having a navigation mode configured in accordance with an embodiment of the present invention.

Techniques are disclosed for providing a navigation mode in electronic touch sensitive devices. The navigation mode can be used, for example, to advance forward and backward through displayed pages of content on a page-by-page or multi-page basis, such as pages of an eBook, photos, lists such as search results and files, or other consumable content that can be readily displayed in a page-like fashion. Likewise, the navigation mode can also be used, for example, to navigate from book to book, album to album, etc. The user can engage the navigation mode with a particular gesture that includes a combination of contact points that uniquely and/or globally identify that the navigation mode is desired. The combination may include, for example, a press-and-hold activation contact point by one hand of the user, and one or more additional moving contact points that indicate the desired navigation using the other hand of the user. Horizontal and vertical paging speeds correspond to the number of moving contact points, which can be effected with swiping or circular gestures, for instance. Given the uniqueness and possibly global nature of the engagement mechanism, the mode can be similarly invoked within multiple diverse applications (e.g., eBook, browser, picture viewer, etc) and without conflicting with other global gestures that might also be used by the device's operating system.

General Overview

As previously explained, electronic display devices such as tablets, eReaders, and smart phones are commonly used for displaying user interfaces and consumable content. The user of such devices can typically page through the displayed content with relative ease. In some instances, however, the user might prefer a more customized navigation scheme that can be uniquely activated on a global level to enhance the consumption experience. While available navigation techniques such as page turning are commonly provided within a given application, those same techniques cannot be used outside that application (e.g., the techniques only work when an eBook is being read). Likewise, user interface commands relevant to a given application cannot conflict with global commands. In this sense, the user is required to remember various application-based navigation techniques, and must know which technique to use depending on the given application. Such complexity can effectively diminish the user's consumption experience, or may simply inhibit wide spread adoption or otherwise leave the available techniques underutilized.

Thus, and in accordance with an embodiment of the present invention, techniques are disclosed for providing a navigation mode in electronic touch sensitive devices, such as touch screen and track pad devices. The navigation mode can be used, for example, to advance forward and backward through displayed pages of content on a page-by-page or multi-page basis, such as the pages of an eBook, lists such as search results and files, or other consumable content that can be readily displayed to a user in a page-like fashion (e.g., advancing through photos on a photo-by-photo or multi-photo basis). The navigation mode can also be used, for example, to advance at a more coarse level. For instance, in addition to navigating through pages of a book, or pictures of a photo album, or songs or an album, the user can also navigate from book to book within a virtual library, or picture album to picture album, or song album to song album. The user can engage the navigation mode, for instance, with a particular touch screen/pad gesture that includes a combination of contact points that globally and/or otherwise uniquely identify that the navigation mode is desired.

In one example embodiment, the combination of contact points includes an activation contact point applied by one hand of the user and one or more additional moving contact points applied by the user's other hand that indicate the desired navigation. For instance, the right hand of a left-handed user, or the left hand of a right-handed user, can provide the activation contact point, in some example cases. Horizontal and vertical paging can be executed, and at speeds that correspond to the number of moving contact points used. For instance, in one example case, one moving contact point corresponds to a 1-page advancement, two moving contact points corresponds to 2-page advancement, . . . and five moving contact points corresponds to 5-page advancement. The navigation gesture associated with the moving contact points may be, for instance, a horizontal or vertical swipe to navigate in those respective directions either forward or backward. Other gestures, such as diagonal swipe or circular, may also be used. In some cases, the user can specify a right or left hand preference, and may also apply a page advancement multiplier to the number of moving contact points. For instance, a multiplier set to 5 and 2 moving contact points corresponds to 10-page advancement per gesture. The multiplier can be automatically applied, for instance, to a particular type of gesture, such as a diagonal swipe or a circular gesture.

As previously indicated, the user can engage the navigation mode with a particular combination of contacts/gestures that uniquely indicate a desired intent to engage the mode, such as a press-and-hold at the edge of the device touch screen or track pad, or on the device home button (or other such physical feature), or a tap or sequence of taps on a housing configured with acoustics sensors. Such a touch is generally referred to herein as an activation point. This, used in combination with one or more moving contact points on the same (or different) touch sensitive surface, causes real-time engagement of the navigation mode, in accordance with an embodiment of the present invention. In a more general sense, any uniquely identifiable set of contact points on a touch sensitive surface(s) by the user can be used to engage the navigation mode. The uniqueness of the touch may be based, for example, on the particular location of the touch (e.g., edge of display or track pad for activation point and over displayed content for gesture/moving point(s), etc) and/or the nature of the touch (e.g., press-and-hold for a predetermined duration, the number of simultaneously applied contact points, the sequence of taps, drags, swipes, circular or elliptical gestures, etc).

Once the navigation mode is engaged, the user may continue to maintain the activation point (or points) while the page advancement is provided in unison with the user directed page turning based on the moving point (or points). To exit the navigation mode, the user can release the activation point(s), for example. In other embodiments, once activated, the activation point can be released, so that only the moving point(s) are needed. In one such example case, a navigation mode icon may appear in the status bar or other display area of the device, once the mode is engaged. This icon can be used to effectively indicate to the user that navigation mode is engaged and that the activation point has effectively been internalized, and the desired navigation gestures supported by that mode can be used. To exit the mode, the user can touch or tap the icon, for example.

The techniques can be implemented in an intuitive manner, so that the user can seamlessly and selectively engage, pause, and/or disengage the navigation mode without disrupting the reading experience, in accordance with some embodiments. For instance, in one specific such embodiment, a thumb press-and-hold gesture along the border region of the display screen can be used in combination with one or more swiping/circular gestures to automatically advance an appropriate number of pages. Alternatively, a stylus could be used in combination with one or more fingers. For instance, for a right-handed user, the left thumb could be placed at the left-side boarder of the display and the stylus tip could be generally placed and swiped or flicked over the content area to turn pages. In any such cases, the use of two (or more) contact points can be used to uniquely identify the user's desire to engage the navigation mode. Numerous uniquely identifiable engagement schemes that exploit a touch sensitive surface can be used as will be appreciated in light of this disclosure. Further note that any touch sensitive device (e.g., track pad, touch screen, or other touch sensitive surface, whether capacitive, resistive, acoustic or other touch detecting technology) may be used to detect the user contact, and the claimed invention is not intended to be limited to any particular type of touch sensitive technology, unless expressly stated.

Architecture

Figure 1B:
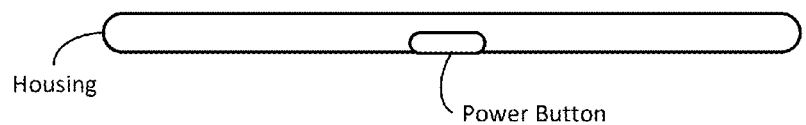

FIGS. 1a-b illustrate an example electronic touch sensitive device having a navigation mode configured in accordance with an embodiment of the present invention. The device could be, for example, a tablet such as the NOOK® Tablet by Barnes & Noble. In a more general sense, the device may be any electronic device having a touch sensitive user interface and capability for displaying content to a user, such as a mobile phone or mobile computing device such as a tablet or laptop, a desktop computing system, a television, a smart display screen, or any other device having a touch screen display or a non-touch display screen that can be used in conjunction with a touch sensitive surface. As will be appreciated, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as a navigation mode as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. One physical gesture that would safely put the device to sleep. Thus, in such an example embodiment, the home button may be associated with and control different and unrelated actions: 1) show the quick navigation menu; 2) exit the navigation mode, but keep the page being read or otherwise consumed displayed (e.g., so that another mode can be entered, if so desired); and 3) put the device to sleep. Numerous other configurations and variations will be apparent in light of this disclosure, and the claimed invention is not intended to be limited to any particular set of hardware buttons or features, or device form factor.

As can be further seen, the status bar may also include a book icon (upper left corner). In some such cases, the user can access a sub-menu that provides access to a navigation mode configuration sub-menu by tapping the book icon of the status bar. For example, upon receiving an indication that the user has touched the book icon, the device can then display the multi-touch navigation mode configuration sub-menu shown in FIG. 1d. In other cases, tapping the book icon just provides bibliographic information on the content being consumed. Another example way for the user to access a navigation mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the multi-touch navigation mode configuration sub-menu of FIG. 1d to be displayed, in accordance with an embodiment. In other example embodiments, selecting the Screen/UI option may present the user with a number of additional sub-options, one of which may include a so-called multi-touch navigation mode option, which may then be selected by the user so as to cause the navigation mode configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
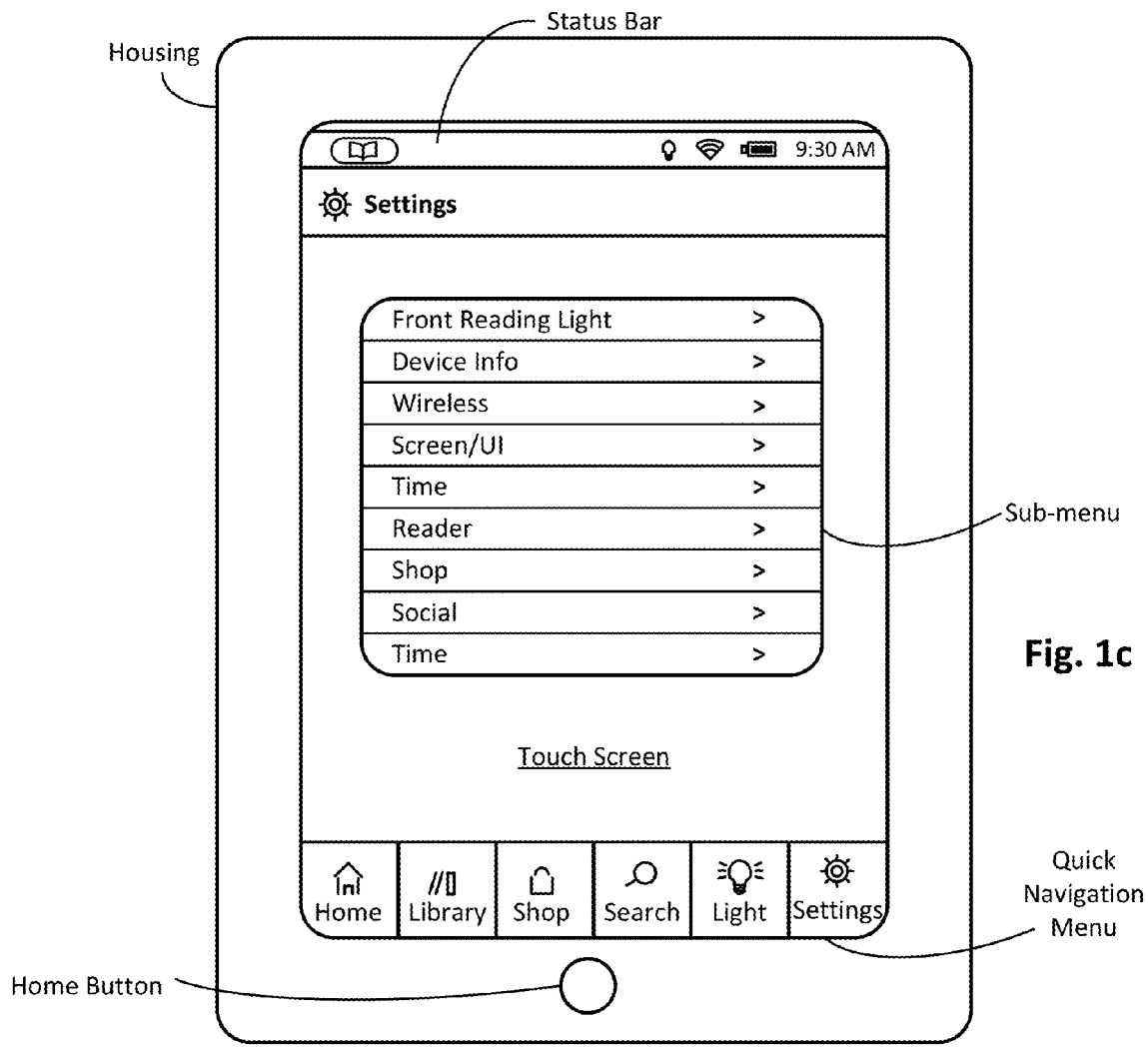
FIGS. 1c-d illustrate example configuration screen shots of the user interface of the electronic touch sensitive device shown in FIGS. 1a-b, configured in accordance with an embodiment of the present invention.
Figure 1D:
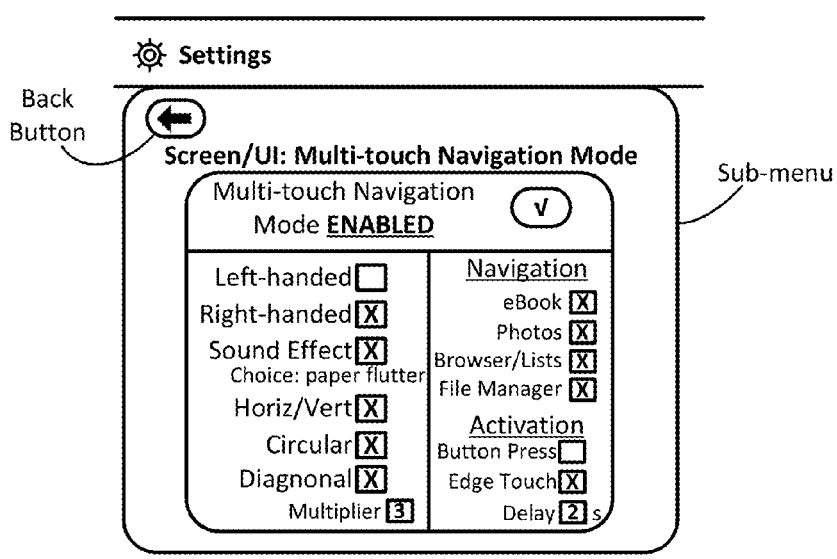

As previously explained, and with further reference to FIGS. 1c and 1d, once the Settings sub-menu is displayed (FIG. 1c), the user can then select the Screen/UI option. In response to such a selection, the multi-touch navigation mode configuration sub-menu shown in FIG. 1d can be provided to the user. In this example case, the multi-touch navigation mode configuration sub-menu includes a UI check box that when checked or otherwise selected by the user, effectively enables the multi-touch navigation mode (shown in the enabled state); unchecking the box disables the mode. Other embodiments may have the navigation mode always enabled, or enabled by a physical switch or button, for example. The user can configure a number of features with respect to the navigation mode, in this example embodiment. In more detail, by checking the Left-handed or Right-handed check box, the user can effectively define which hand will provide the activation point(s) and which hand will provide the moving point(s) during navigation mode. In general, the user's dominant or preferred hand may be best suited to provide the moving points, but that need not necessarily be the case. As can be further seen, the user may also check the Sound Effect check box to provide a sound effect when virtual pages are turned (e.g., such as paper flutter sound, or the sound of an actual page or pages being turned), if so desired. In one specific example embodiment, a single-page turn can be associated with a corresponding single-page turn sound, and a multi-page turn can be associated with a corresponding multi-page turn sound. In a similar fashion, each type of multi-page turn (e.g., 2-page turn, 3-page turn, etc) can be associated with a distinct or otherwise appropriate sound, so as to enhance the user's virtual page turning experience. For instance, the greater the number of pages being turned per gesture, the faster or fuller the paper flutter sound provided will be, in some specific such embodiments. The sounds provided may also be arbitrary, and may also be downloaded to the device from other sources, if so desired.

As can be further seen with reference to the example embodiment of FIG. 1 d, the user may also check the Horiz/Vert check box to designate that horizontal and/or vertical swipes or gestures can be used for the moving contact points. In addition, or alternatively, by checking the Circular check box, the user can designate that circular gestures can be used for the moving contact points. In one such example case, a clockwise circular gesture with one finger (or stylus) can be used for a 1-page forward advance, and a counter-clockwise single contact gesture can be used for a 1-page backward advance. In a similar fashion, two fingers can be used for a 2-page advance, and three fingers can be used for a 3-page advance, etc. In addition, or alternatively, by checking the Diagonal check box, the user can designate that diagonal gestures can be used for the moving contact points. In one such example case, an upward diagonal gesture with one finger (or stylus) can be used for a 1-page forward advance, and a downward diagonal single contact gesture can be used for a 1-page backward advance. In a similar fashion, a two finger diagonal gesture can be used for a 2-page advance, etc. As can be further seen with reference to the example embodiment of FIG. 1d, the user can specify a multiplier associated with diagonal (and/or circular) gestures, so that the number of pages turned per gesture is the product of the number of moving contact points and the multiplier (e.g., an upward 2-point diagonal gesture with a multiplier of 3 will yield a 6-page forward advance, or a clockwise 5-point circular gesture (one complete circle) with a multiplier of 5 will yield a 25-page forward advance). Such large paging increments may be helpful, for instance, when jumping between known sections or chapters of a voluminous text or treatise, or paging through an alphabetical listing of 1000+ music files beginning in the 'A' section and paging quickly to the 'M' section. Note that any combination of the Horiz/Vert, Circular, and/or Diagonal check boxes may be checked to provide the user with various navigation choices and assist the navigation experience.

With further reference to the example embodiment of FIG. 1d, the user may also select specific applications to which the navigation mode can be applied. Such a configuration feature may be helpful, for instance, in a tablet or laptop or other multifunction computing device that can execute different applications (as opposed to a device that is more or less dedicated to a particular application). For instance, in the example case shown, the navigation mode can be applied to an eBook application (e.g., navigating through a given eBook), a photo viewing application (e.g., paging from one photo to the next within a given camera roll or picture set, etc), a browser application (e.g., paging through search listings, etc), and/or a file manager application (e.g., paging through music file listings, eBook file listings, etc), if so desired. Any number of applications or device functions may benefit from a navigation mode as provided herein, and the claimed invention is not intended to be limited to any particular application or set of applications.

Also configurable via the UI screen example of FIG. 1d is the mechanism by which user engages the navigation mode as well as the activation time. In particular, the user can assign the activation point function to a hardware switch such as the home button by checking the Button Press check box, or to an area of the touch screen by checking the Edge Touch check box, in this example case. Also, note that the duration which the user's press-and-hold gesture (on either the hardware button or the touch screen) for the activation point to engage the navigation mode is set to 2 seconds in this example case. As previously explained, this activation point can be provided in conjunction with one or more moving contact points to effect a desired navigation. As will be appreciated in light of this disclosure, a configurable activation delay can be set to distinguish the navigation mode engagement sequence from other available modes of operation or functions. For instance, a given contact point area of the touch sensitive surface of the device can be tapped (e.g., touch-and-release of 1 second or less) to launch a timer function or other application, or can be pressed-and-held (e.g., 2 seconds or more) to engage the navigation function. As previously explained, the user may continue to hold the activation point contact (in one example embodiment), or may release the activation point once the navigation mode engages (in another embodiment). In the latter case, an icon may be provided in the status bar to let the user know the navigation mode is enabled, and the user can tap the same activation point area to exit the mode. In addition, a back button arrow UI control feature is provisioned on the touch screen, so that the user can go back to the Settings menu after the navigation mode has been configured, if so desired.

Figure 2A:
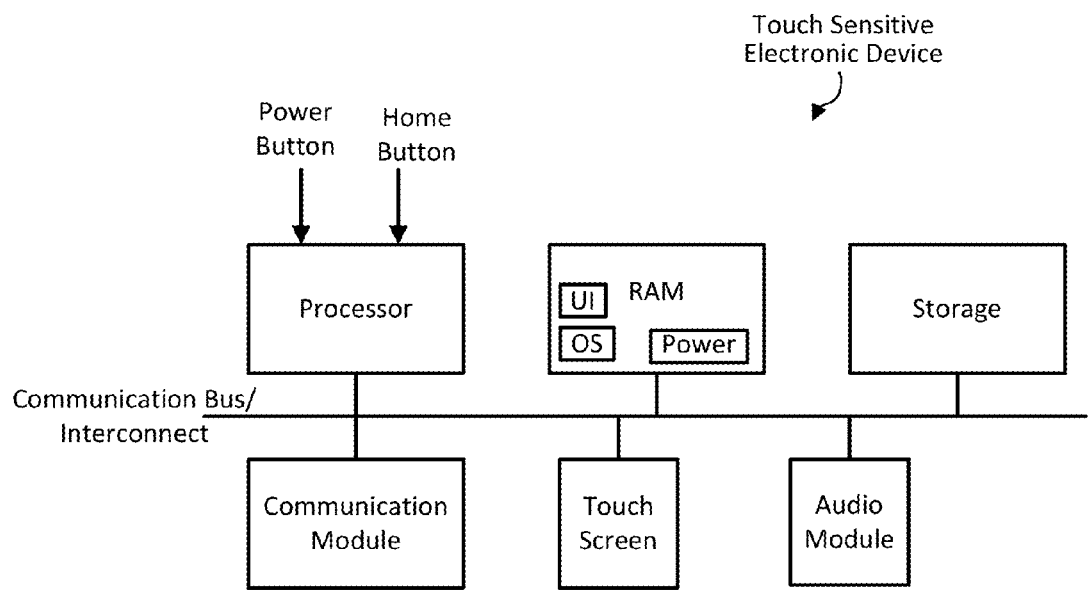
FIG. 2a illustrates a block diagram of an electronic touch sensitive device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a navigation mode as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be, for instance, any suitable 802.11b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a-d and 3a-j in conjunction with the navigation mode methodologies demonstrated in FIG. 4, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In such audio-based cases, note that the navigation function as described herein can be used to identify the textual content to be converted to audio. In some example cases, if additional space is desired, for example, to store digital books or other content and media, storage can be expanded via a microSD card or other suitable memory expansion technology (e.g., 32 GBytes, or higher).

Client-Server System

Figure 2B:
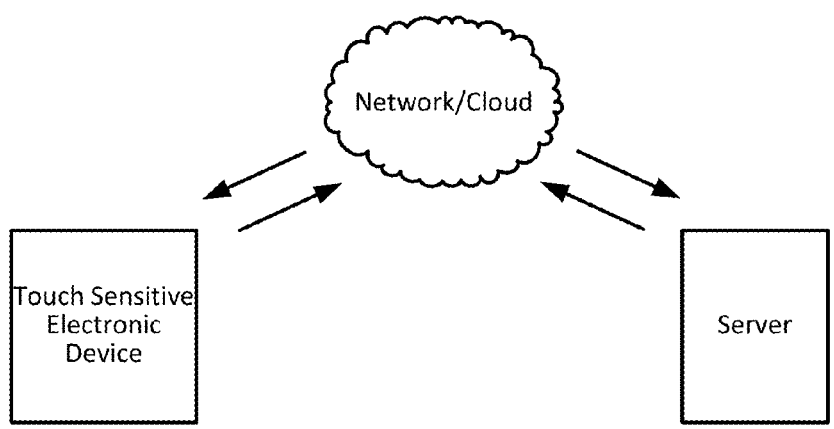
FIG. 2b illustrates a block diagram of a communication system including the electronic touch sensitive device of FIG. 2b, configured in accordance with an embodiment of the present invention.

FIG. 2b illustrates a block diagram of a communication system including the electronic touch sensitive device of FIG. 2b, configured in accordance with an embodiment of the present invention. As can be seen, the system generally includes an electronic touch sensitive device that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. Is some such embodiments, the server is configured to remotely provision a navigation function as provided herein to the touch sensitive device (e.g., via JavaScript or other browser based technology). In other embodiments, portions of the methodology are executed on the server and other portions of the methodology are executed on the device. Numerous server-side/client-side execution schemes can be implemented to facilitate a navigation mode in accordance with an embodiment, as will be apparent in light of this disclosure.

Multi-Touch Navigation Examples

FIGS. 3a-j each illustrates an example multi-touch navigation mode of an electronic touch sensitive device, in accordance with an embodiment of the present invention. As can be seen, the device includes a touch sensitive surface, which may be, for example, a touch screen display, a track pad, or any other touch sensitive surface for receiving a multi-touch point user input.

Figure 3A:
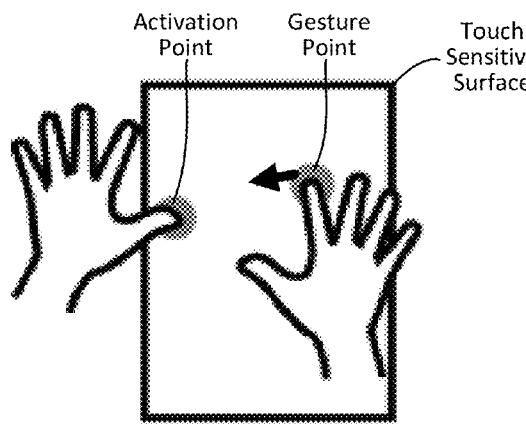
FIGS. 3a-j each illustrates an example multi-touch navigation mode of an electronic touch sensitive device, in accordance with an embodiment of the present invention.
Figure 3B:
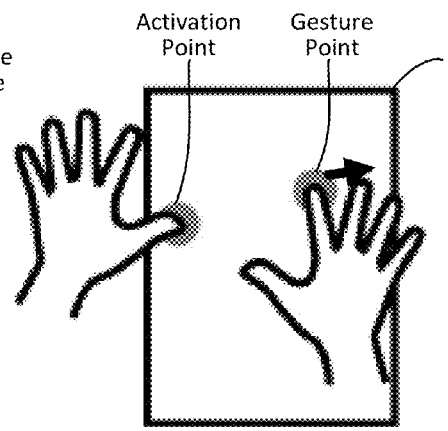

In the example engagement mode shown in FIG. 3a, the user is using two contact points: an activation point on the left edge of the touch sensitive surface and a gesture point moving from right to left on the touch sensitive surface, so as to navigate in that direction (e.g., forward 1-page). FIG. 3b is similar to FIG. 3a, except that the gesture point is moving from left to right on the touch sensitive surface, to navigate in the opposite direction (e.g., backward 1-page).

As can be seen in this example scenario of FIGS. 3a-b, the activation point is provided with the thumb of the user's left hand, and the gesture point is provided by the pointer finger of the user's right hand. Of course, the various contact points can be made with other fingers, styluses, or any other implement or body part that can provide the requisite impact on the touch sensitive surface. Likewise, depending on the user's preference for right-handed or left-handed operations, assuming the user has such a preference, the activation point may be provided with the other hand, etc. Further note that the various provided contact points do not need to be aligned in anyway or otherwise grouped together, but rather can each be provided on a designated or otherwise suitable location of the touch sensitive surface. For example, in some such embodiments, the activation point can be provided in a specific region of the touch sensitive surface (e.g., as designated in a configuration page, such as shown in FIG. 1d), while the gesture point can be provided anywhere else on the touch sensitive surface. In a more general sense, any portion of the touch sensitive surface can be used as a navigation mode activation point and any other location of that surface can be used to provide the gesture point. Likewise, as previously explained, a hardware button press (or other such hardware-based indication) may also be used in place of the activation point. Numerous uniquely identifiable activation-gesture point schemes can be used as will be appreciated in light of this disclosure. As will be appreciated, much of this discussion with respect to FIGS. 3a-b is equally relevant to the description of FIGS. 3c-j.

Figure 3C:
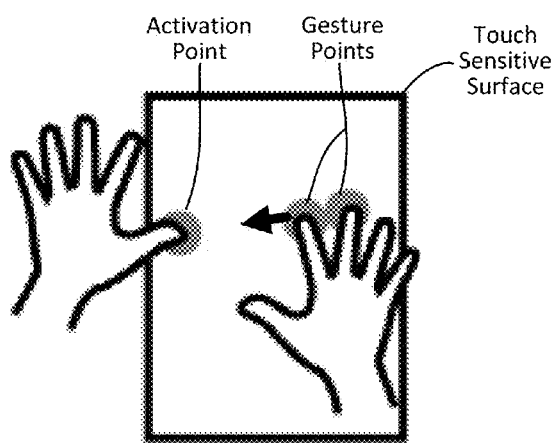
Figure 3D:
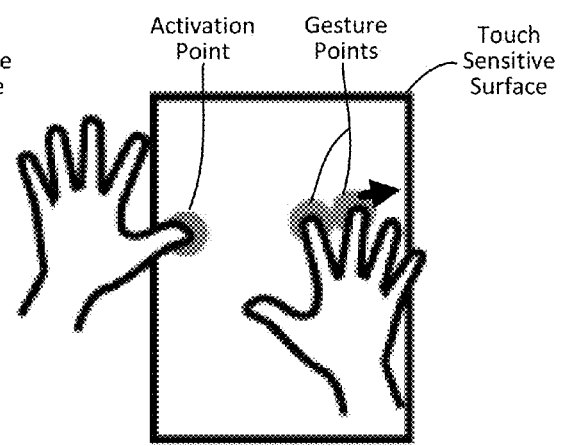
Figure 3E:
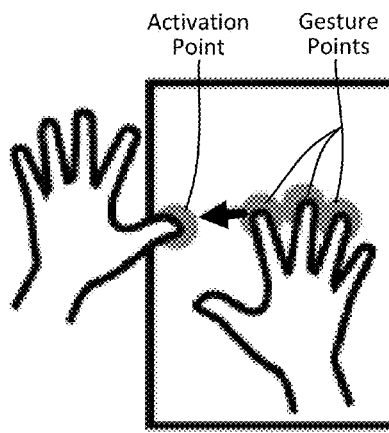
Figure 3F:
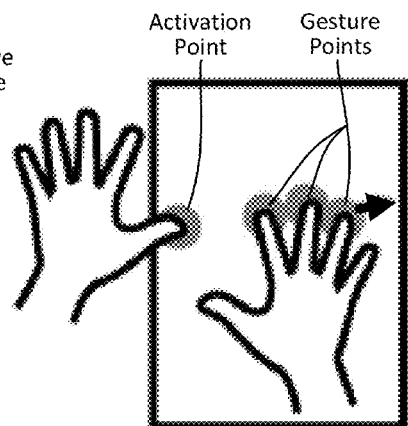

In the example engagement mode shown in FIG. 3c, the user is using three contact points: an activation point on the left edge of the touch sensitive surface and two gesture points moving from right to left on the touch sensitive surface, so as to navigate in that direction (e.g., forward 2-pages). FIG. 3d is similar to FIG. 3c, except that the two gesture points are moving from left to right on the touch sensitive surface, to navigate in the opposite direction (e.g., backward 2-pages). In the example engagement mode shown in FIG. 3e, the user is using four contact points: an activation point on the left edge of the touch sensitive surface and three gesture points moving from right to left on the touch sensitive surface, so as to navigate in that direction (e.g., forward 3-pages). FIG. 3f is similar to FIG. 3d, except that the three gesture points are moving from left to right on the touch sensitive surface, to navigate in the opposite direction (e.g., backward 3-pages).

Figure 3G:
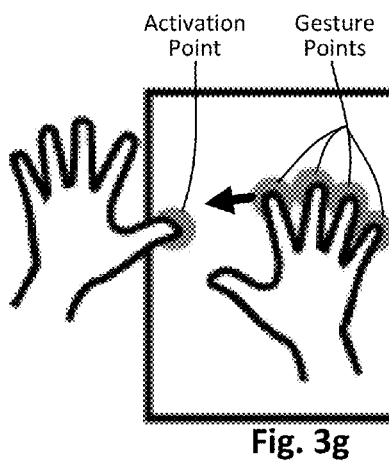
Figure 3H:
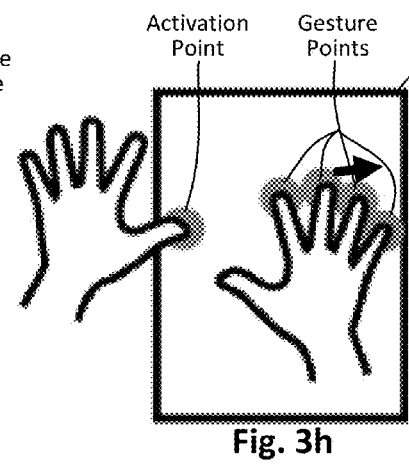
Figure 3I:
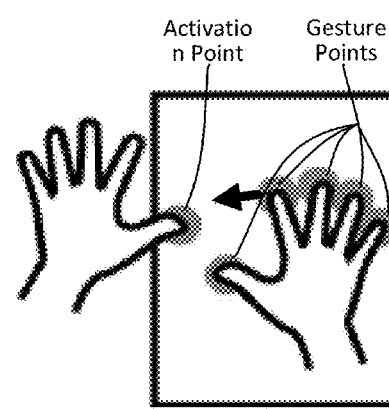
Figure 3J:
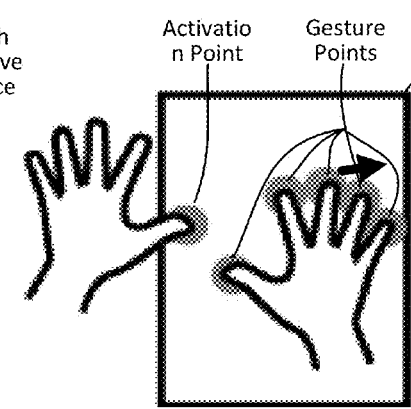

In the example engagement mode shown in FIG. 3g, the user is using five contact points: an activation point on the left edge of the touch sensitive surface and four gesture points moving from right to left on the touch sensitive surface, so as to navigate in that direction (e.g., forward 4-pages). FIG. 3h is similar to FIG. 3g, except that the four gesture points are moving from left to right on the touch sensitive surface, to navigate in the opposite direction (e.g., backward 4-pages). In the example engagement mode shown in FIG. 3i, the user is using six contact points: an activation point on the left edge of the touch sensitive surface and five gesture points moving from right to left on the touch sensitive surface, so as to navigate in that direction (e.g., forward 5-pages). FIG. 3j is similar to FIG. 3i, except that the five gesture points are moving from left to right on the touch sensitive surface, to navigate in the opposite direction (e.g., backward 5-pages).

Methodology

Figure 4:
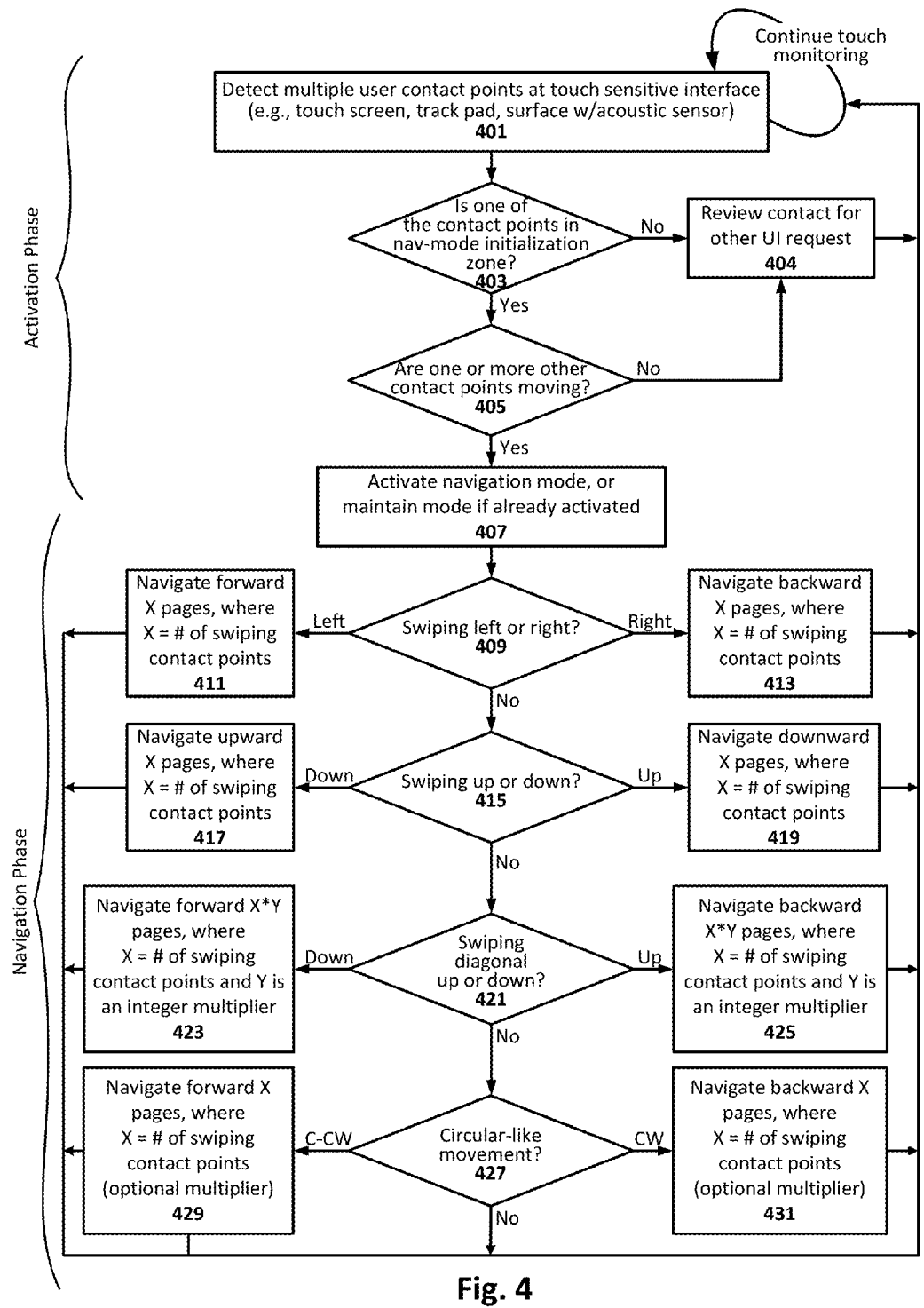
FIG. 4 illustrates a method for providing a multi-touch navigation mode in an electronic touch sensitive device, in accordance with an embodiment of the present invention.

FIG. 4 illustrates a method for providing a multi-touch navigation mode in an electronic touch sensitive device, in accordance with an embodiment of the present invention. This example methodology may be implemented, for instance, by the UI module of the touch sensitive device shown in FIG. 2a, or the touch sensitive device shown in FIG. 2b (e.g., with the UI provisioned to the client by the server). To this end, the UI can be implemented in software, hardware, firmware, or any combination thereof, as will be appreciated in light of this disclosure.

As can be seen, the method includes an activation phase and a navigation phase. Each phase includes sensing a user's input by a touch sensitive surface, and the phases may overlap in time (at least partially) or may be completely sequential in nature, as will be appreciated in light of this disclosure. In general, any touch sensitive device may be used to detect contact with it by one or more fingers and/or styluses. As soon as the user begins to drag or otherwise move the contact points, the UI code (and/or hardware) can assume a drag gesture has been engaged and track the path of each contact point with respect to any fixed point within the touch surface until the user stops engaging the touch sensitive surface. The release point can also be captured by the UI as it may be used to commit the action started when the user pressed on the touch sensitive surface. In a similar fashion, if the user releases hold without moving the contact point, a press or press-and-hold command may be assumed depending on the amount of time the user was continually pressing on the touch sensitive surface. These main detections can be used in various ways to implement UI functionality, including a navigation mode as variously described herein.

In this example case, the activation phase of the method includes detecting 401 multiple user contact points at the touch sensitive interface. In general, the touch monitoring is effectively continuous. The method continues with determining 403 if at least one of the contact points is in the navigation mode activation zone. As previously indicated, one example activation zone is the edge or perimeter of the touch sensitive surface. Other embodiments may have the activation zone anywhere on the touch sensitive surface that is specified by the user via a configuration menu. In a more general sense, the navigation mode activation zone can be pre-established in any specific location on the touch sensitive surface of the device.

In any case, if the contact is not in the navigation mode activation zone, then the method may continue with reviewing 404 the contact for some other UI request (e.g., select a file, send an email, etc). On the other hand, if the contact is in the navigation mode activation zone, the method continues with determining 405 if one or more other contact points are moving (e.g., being dragged in a horizontal, vertical, diagonal, or circular motion). If the one or more other contact points are not moving, then the method may continue with reviewing 404 the contact for some other UI request. On the other hand, if the one or more other contact points are moving, then the method continues with activating 407 the navigation mode, or maintaining that mode if already activated.

In the navigation phase, the method continues with determining 409 if the moving contact points are swiping left or right. If swiping left then the UI code assumes the user is actively paging forward in the horizontal direction and the method continues with navigating 411 forward X pages, where X is the number of moving/swiping contact points. If swiping right then the UI code assumes the user is actively paging backward in the horizontal direction and the method continues with navigating 414 backward X pages. If the moving contact points are not swiping left or right, the method continues with determining 415 if the moving contact points are swiping up or down. If swiping down then the UI code assumes the user is actively paging upward and the method continues with navigating 417 upward X pages, where X is the number of moving/swiping contact points. If swiping up then the UI code assumes the user is actively paging downward and the method continues with navigating 419 downward X pages. As will be appreciated in light of this disclosure, whether a particular gesture causes forward or backward navigation, or upward or downward navigation, can be programmed or otherwise configured to comply with a given convention as desired, and the claimed invention is not intended to be limited to any particular convention.

If the moving contact points are not swiping up or down, the method continues with determining 421 if the moving contact points are swiping diagonally up or down. If swiping diagonally down (and to the left, for instance) then the UI code assumes the user is actively paging forward in the horizontal direction and the method continues with navigating 423 forward X*Y pages, where X is the number of diagonally moving contact points and Y is a multiplier configured by the user or otherwise pre-established. If swiping diagonally up (and to the right, for instance) then the UI code assumes the user is actively paging backward in the horizontal direction and the method continues with navigating 425 backward X*Y pages. Numerous variations will be apparent in light of this disclosure. For instance, if swiping diagonally down (and to the right, for instance) then the UI code assumes the user is actively paging backward in the vertical direction and the method continues with navigating backward X*Y pages. If swiping diagonally up (and to the left, for instance) then the UI code assumes the user is actively paging forward in the vertical direction and the method continues with navigating 425 forward X*Y pages.

If the moving contact points are not swiping diagonally up or down, the method of this example embodiment continues with determining 427 if the moving contact points are moving in a circular-like fashion. If moving counter-clockwise then the UI code assumes the user is actively paging forward in the horizontal direction and the method continues with navigating 429 forward X, where X is the number of circularly moving contact points. If moving clockwise then the UI code assumes the user is actively paging backward in the horizontal direction and the method continues with navigating 425 backward X pages. Just as previously explained, an optional multiplier may be associated with circular gestures, if so desired. Likewise, circular gestures may also be used to navigate in the vertical (up/down) direction, if so desired. While a number of user-configurable features are provided in some example embodiments (e.g., such as shown in FIG. 1d), other example embodiments may have any combination of similar features wherein the features are set as a given default or hard-coded, such that no user configuration is necessary.

The method may continue in the touch monitoring mode indefinitely or as otherwise desired, so that any multi-touch contact provided by the user can be evaluated and used as a navigation command. As previously indicated, the navigation mode can be exited by, for example, the user removing the activation contact point or pressing a release mode UI feature such as the home button or a touch screen feature.

Numerous variations and embodiments will be apparent in light of this disclosure. For instance, different navigating functions can be assigned to horizontal and vertical gestures. For example, horizontal gestures can be used to advance from page to page within a book, picture to picture within a picture album, song to song within a music album, etc, while vertical gestures can be used to advance from book to book within a library, picture album to picture album, music album to music album, etc.

One embodiment of the present invention provides a device including a display for displaying content to a user, and a touch sensitive surface for allowing user input. The device further includes a user interface including a multi-touch navigation mode that is configured to be activated in response to user contact via the touch sensitive interface, the user contact including a fixed activation point and one or more moving gesture points, the one or more moving gesture points defining a navigation gesture. In some cases, the display is a touch screen display that includes the touch sensitive surface. In some cases, the touch sensitive surface is a track pad. In some cases, the quantity of the one or more moving gesture points defines how many pages to advance displayed content per navigation gesture. In some cases, the navigation gesture is user-configurable. In some cases, direction of the one or more moving gesture points dictates direction of page advancement of displayed content, such that swipes to the right page backward, swipes to the left page forward. In some cases, the fixed activation point is a press-and-hold contact on the touch sensitive surface, and the navigation mode remains enabled until the press-and-hold contact is released. In other cases, the fixed activation point is a press-and-release contact on the touch sensitive surface, and the navigation mode remains enabled after release of the press-and-release contact and until the navigation mode is affirmatively terminated. In some cases, the fixed activation point has a location that is user-configurable. In some cases, the fixed activation point is received from a first hand of the user and the one or more moving gesture points are received from another hand of the user.

Another embodiment of the present invention provides a device including a display having a touch screen interface and for displaying content to a user, and a user interface including a multi-touch navigation mode that is configured to be activated in response to user contact via the touch sensitive interface, the user contact including a fixed activation point and one or more moving gesture points, the one or more moving gesture points defining a navigation gesture. The quantity of the one or more moving gesture points defines how many pages to advance displayed content per navigation gesture, and the fixed activation point is received from a first hand of the user and the one or more moving gesture points are received from another hand of the user. In some cases, the fixed activation point has a location and at least one of the location and/or the navigation gesture is user-configurable. In some cases, the fixed activation point is a press-and-hold contact on the touch screen interface, and the navigation mode remains enabled until the press-and-hold contact is released. In other cases, the fixed activation point is a press-and-release contact on the touch screen interface, and the navigation mode remains enabled after release of the press-and-release contact and until the navigation mode is affirmatively terminated. In some cases, the device is an eReader device or a tablet computer or a smartphone.

Another embodiment of the present invention provides a computer readable medium encoded with instructions that when executed by one or more processors, cause a content navigation process to be carried out. The process includes, in response to user contact via a touch sensitive interface of a device capable of displaying content, activating a multi-touch navigation mode in the device, the user contact including a fixed activation point and one or more moving gesture points, the one or more moving gesture points defining a navigation gesture, and advancing displayed content based on the navigation gesture. In some cases, the quantity of the one or more moving gesture points defines how many pages to advance displayed content per navigation gesture. In some cases, the fixed activation point has a location, and at least one of the location and/or the navigation gesture is user-configurable. In some cases, the fixed activation point is a press-and-hold contact on the touch sensitive surface, and the navigation mode remains enabled until the press-and-hold contact is released. In other cases, the fixed activation point is a press-and-release contact on the touch sensitive surface, and the navigation mode remains enabled after release of the press-and-release contact and until the navigation mode is affirmatively terminated.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a display for displaying content to a user;
a touch sensitive surface for allowing user input; and
a user interface including a multi-touch navigation mode that is configured to be activated in response to user contact via the touch sensitive surface, the user contact including a fixed activation point and one or more moving gesture points, the one or more moving gesture points defining a navigation gesture, wherein for a given configuration of the multi-touch navigation mode, any portion of the touch sensitive surface can be used as the activation point.

2. The device of claim 1 wherein the display is a touch screen display that includes the touch sensitive surface.

3. The device of claim 1 wherein the touch sensitive surface is a track pad.

4. The device of claim 1 wherein the quantity of the one or more moving gesture points defines how many pages to advance displayed content per navigation gesture.

5. The device of claim 1 wherein the navigation gesture is user-configurable.

6. The device of claim 1 wherein direction of the one or more moving gesture points dictates direction of page advancement of displayed content, such that swipes to the right page backward, swipes to the left page forward.

7. The device of claim 1 wherein the fixed activation point is a press-and-hold contact on the touch sensitive surface, and the navigation mode remains enabled until the press-and-hold contact is released.

8. The device of claim 1 wherein the fixed activation point is a press-and-release contact on the touch sensitive surface, and the navigation mode remains enabled after release of the press-and-release contact and until the navigation mode is affirmatively terminated.

9. The device of claim 1 wherein the fixed activation point need not be on the displayed content.

10. The device of claim 1 wherein without the fixed activation point, the one or more moving gesture points define a gesture that is independent of the navigation gesture.

11. A device, comprising:
a display having a touch screen interface and for displaying content to a user; and
a user interface including a multi-touch navigation mode that is configured to be activated in response to user contact via the touch sensitive interface, the user contact including a fixed activation point and one or more moving gesture points, the one or more moving gesture points defining a navigation gesture;
wherein without the fixed activation point, the one or more moving gesture points define a gesture that is independent of the navigation gesture.

12. The device of claim 11 wherein the fixed activation point has a location and at least one of the location and/or the navigation gesture is user-configurable.

13. The device of claim 11 wherein the fixed activation point is a press-and-hold contact on the touch screen interface, and the navigation mode remains enabled until the press-and-hold contact is released.

14. The device of claim 11 wherein the fixed activation point is a press-and-release contact on the touch screen interface, and the navigation mode remains enabled after release of the press-and-release contact and until the navigation mode is affirmatively terminated.

15. The device of claim 11 wherein for a given configuration of the multi-touch navigation mode, any portion of the touch screen interface can be used as the activation point.

16. A non-transitory computer readable medium encoded with instructions that when executed by one or more processors, cause a content navigation process to be carried out, the process comprising:
in response to user contact via a touch sensitive interface of a device capable of displaying content, activating a multi-touch navigation mode in the device, the user contact including a fixed activation point and one or more moving gesture points, the one or more moving gesture points defining a navigation gesture, wherein for a given configuration of the multi-touch navigation mode, any portion of the touch sensitive interface can be used as the activation point; and
advancing displayed content based on the navigation gesture.

17. The computer readable medium of claim 16 wherein the quantity of the one or more moving gesture points defines how many pages to advance displayed content per navigation gesture.

18. The computer readable medium of claim 16 wherein without the fixed activation point, the one or more moving gesture points define a gesture that is independent of the navigation gesture.

19. The computer readable medium of claim 16 wherein the fixed activation point is a press-and-hold contact on the touch sensitive surface, and the navigation mode remains enabled until the press-and-hold contact is released.

20. The computer readable medium of claim 16 wherein the fixed activation point is a press-and-release contact on the touch sensitive surface, and the navigation mode remains enabled after release of the press-and-release contact and until the navigation mode is affirmatively terminated.

* * * * *